Sept. 15, 1970  C. D. MOORE  3,529,119
FLASH WELDING MACHINE

Filed July 10, 1967  2 Sheets-Sheet 1

United States Patent Office 3,529,119
Patented Sept. 15, 1970

3,529,119
FLASH WELDING MACHINE
Charles Dana Moore, Rowley, Mass., assignor to Thomson Electric Welder Company, Inc., Lynn, Mass., a corporation of Massachusetts
Filed July 10, 1967, Ser. No. 652,218
Int. Cl. B23k 11/04
U.S. Cl. 219—97                    5 Claims

ABSTRACT OF THE DISCLOSURE

A flash welding machine including a first cylinder and first piston for applying force along a first axis, a second cylinder and second piston for applying force along a second axis, stationary platens mounted with each of the cylinders and movable platens mounted with each of the pistons, a first clamp mounted with a portion on each of the stationary platens and a second clamp mounted with a portion on each of the movable platens for holding the work to be welded intermediate the axes.

SUMMARY OF INVENTION

This invention relates to flash welding machines, and more particularly to such machines having a balanced drive system.

Flash welding machines contain a pair of relatively movable platens, each having a current carrying clamp for holding a workpiece to be welded. With the work clamped in place the platens are moved to a position at which an electric arc is struck between workpieces. After the interval required to sufficiently heat the work the platens are brought together to form the weld.

Because of the large forces developed by the drive systems of these machines, the clamping arrangements for holding the work are generally placed external to the path of motion of the movable member of the drive system: the clamp arrangement is mounted alongside the path of movement of the drive system, not between the movable and stationary members. This lessens the chance of misalignment of the drive system, which, when occurring in such high powered systems, may cause extraneous forces that could be ruinous to the machine.

Since the clamping arrangement is offset from the line of force of the drive system, bending moments are generated as a function of the distance between the junction of the workpieces and the line of force application of the drive system. Such moments affect not only the platen drive system but also the current carrying clamps which form a part of the unitized force system when the clamps and platens are closed. Thus, undesirable forces generated by the unbalanced force system are communicated to the entire machine and involve portions not designed to withstand such forces. In addition to the inefficiency caused by the loss of power absorbed by them, these moments overstress parts of the machine and limit the force which can be safely applied by it.

The positions of the workpieces during the arcing period and the final weld-forming operation are critical to the strength of the weld and the efficiency of the operation. The arc should be maintained over a distance which provides the most heat in the shortest time while the final weld-forming position should be such that maximum force is applied to the heated portion of the work-pieces without bending or distorting them.

Setting the workpieces in the proper relationship to one another by arranging them in their respective clamps is difficult and not particularly accurate. And attaining the proper relationship by adjustment of the stroke of the hydraulic device gives rise to similar and additional problems such as those involved in accurately altering the operation of hydraulic drives that apply large forces and operate at high pressures.

Accordingly, it is an object of this invention to provide a flash welding machine having a balanced drive system, which minimizes unwanted and undesirable forces and moments on the machine elements, increases efficiency of the drive system, and increases the force that the machine can safely apply.

It is a further object of this invention to provide a flash welding machine having a simple, inexpensive, and rugged means for quickly, efficiently and precisely setting the relationship between a pair of relatively movable platens.

The invention is accomplished by a flash welding machine including first drive means for applying force along a first axis, first and second platens movable relative to each other by the first drive means, the platens having associated with them, first and second current-carrying clamp portions, respectively, second drive means for applying force along a second axis parallel to the first axis, and third and fourth platens movable relative to each other by the second drive means, the third and fourth platens having third and fourth current-carrying clamp portions cooperating with the first and second clamp portions, respectively, for holding the work to be welded intermediate the axes.

In preferred embodiments there are first adjustable means interconnecting the first drive means and the second platen, second adjustable means interconnecting the second drive means and the fourth platen and adjusting means for varying the positions of the adjustable means and their corresponding platens relative to their corresponding drive means.

DISCLOSURE OF SPECIFIC EMBODIMENT

Other objects, features, and advantages will appear from the following description of a preferred embodiment of the invention, taken together with the following drawings thereof, in which.

Figure 1:
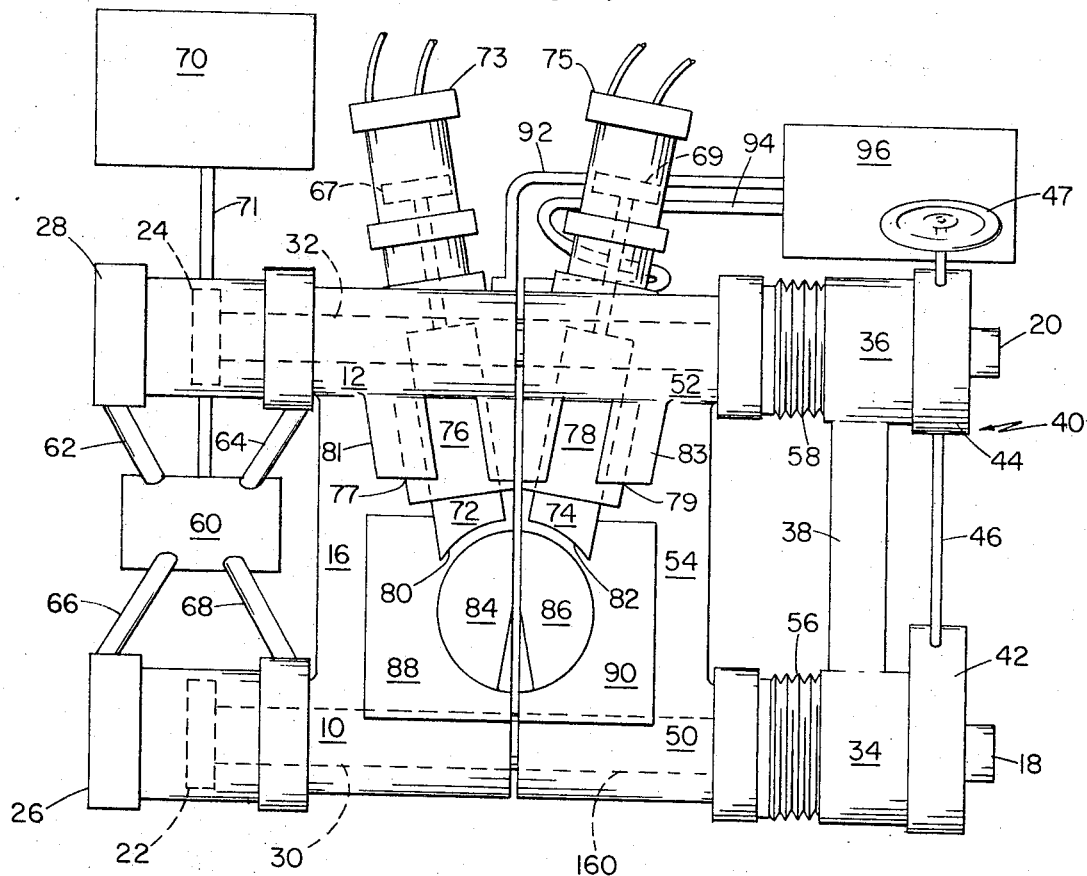
FIG. 1 is a plan view of a flash welding machine according to the invention.
Figure 3:
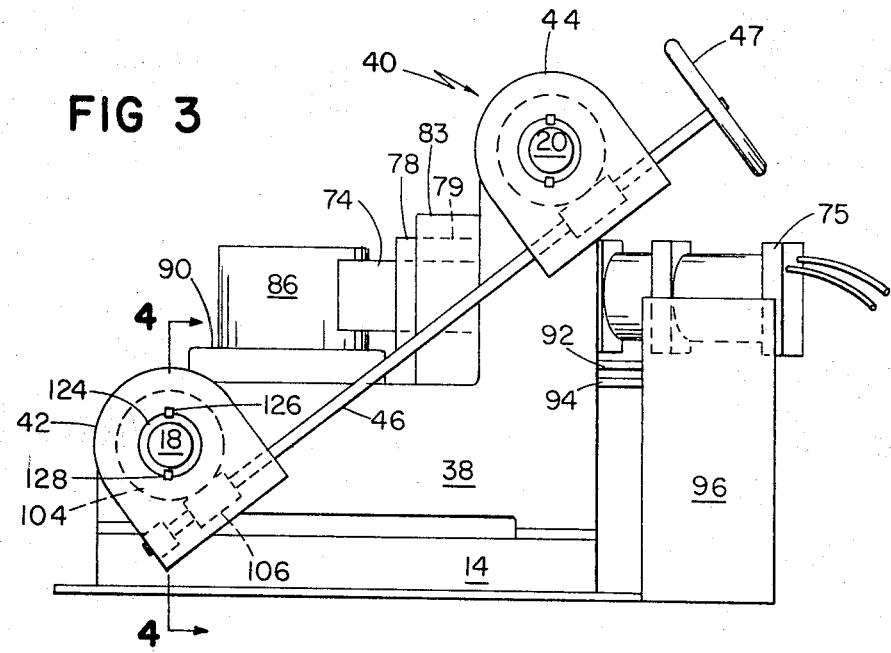
FIG. 3 is an end view of the flash welding machine of FIG. 1.

There is shown in FIG. 1 a front fixed platen 10 and a rear fixed platen 12 connected to each other and to base 14 by a support section 16. Rods 18 and 20 having pistons 22 and 24 at their ends contained within cylinders 26 and 28 are slidably supported in bores 30 and 32 in platens 10 and 12, respectively. The other ends of rods 18 and 20 are slidably supported in bearing blocks 34 and 36 connected to each other and to base 14 by support section 38. Adjustment mechanism 40 includes members 42 and 44 which are mounted on blocks 34 and 36, respectively, and driven simultaneously by shaft 46 rotatable by hand wheel 47, FIG. 3.

Front movable platen 50 and rear movable platen 52 are arranged to move with rods 18 and 20, respectively, and are connected by intermediate section 54. Dust cover diaphragms 56, 58 protect rods 18, 20 between platens 50, 52 and blocks 34, 36, respectively. Fluid motor 60 is interconnected with cylinder 28 by lines 62 and 64 and with cylinder 26 by lines 66 and 68. Reservoir 70 maintains a constant supply of hydraulic fluid through line 71 for motor 60.

Figure 2:
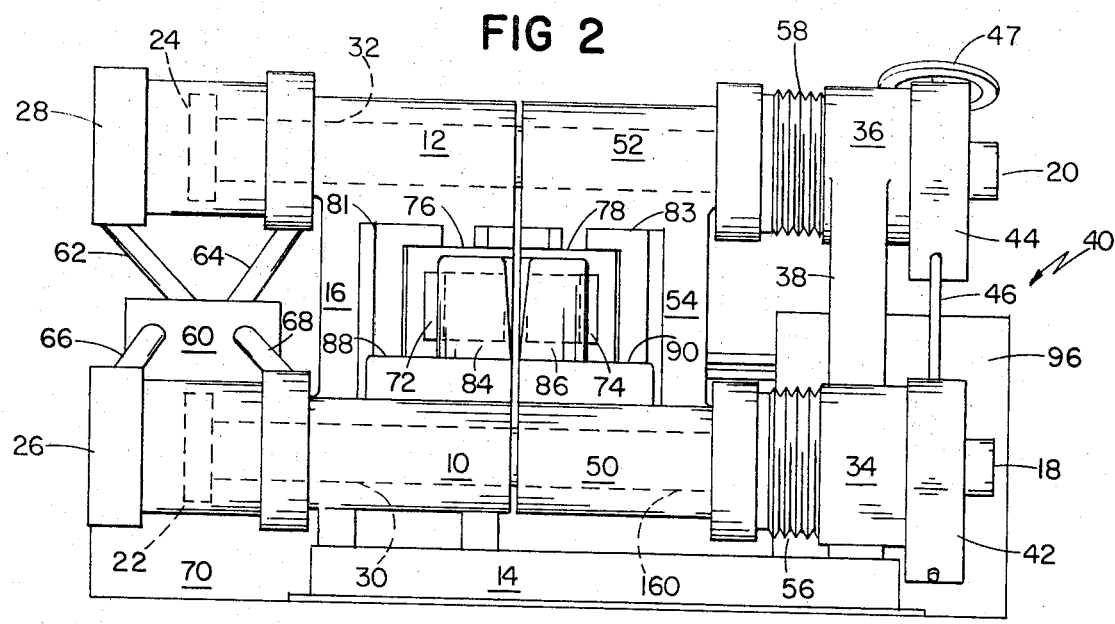
FIG. 2 is a front view of the flash welding machine of FIG. 1.

Electrodes 72 and 74 are moved in housings 76 and 78 by pistons 67 and 69 which are driven by hydraulic pressure from a source not shown applied to hydraulic cylinders 73 and 75 mounted on housings 76 and 78. Electrodes 72 and 74 act as clamps to hold the workpieces between their curved surfaces 80 and 82 and the curved sides of semi-circular cylindrical blocks 84 and 86, FIG. 2. Housings 76 and 78 are mounted in passages 77 and 79 which extend through sections 16 and 54 and collars 81 and 83 below rod 20 and at a slight angle to each other, FIG. 1. Platforms 88 and 90 mounted at the base of blocks 84 and 86 support workpieces clamped in the machine. Electrical power is supplied to electrodes 72 and 74 by heavy conductors 92 and 94 energized by transformer 96.

Reduction of the extraneous moments and forces is primarily accomplished by arranging the components of the machine so that the plane of motion of the clamping electrodes 72, 74 is parallel to the axes of rods 18 and 20 and intersects the plane containing these axes. Ideally, the workpieces are clamped by electrodes 72, 74 along that intersection and midway between the axes of rods 18 and 20. In this way, components of force perpendicular to the plane containing the axes of rods 18 and 20 are eliminated and moments extending in that plane between one of the rods and the clamping surfaces 80, 82, 84 and 86 are offset by equal and opposite moments between those clamping surfaces and the other rod. The arrangement of the specific embodiment shown and described here accomplishes the foregoing while providing easy and full access to the clamping area for installation and removal of the workpieces. The machine need not be installed only as shown in the drawings; it may be disposed with electrodes 72, 74 vertically positioned or various other postures which can readily be envisioned by rotating the machine as pictured in FIG. 3 about the axis of rods 18 or 20.

Figure 4:
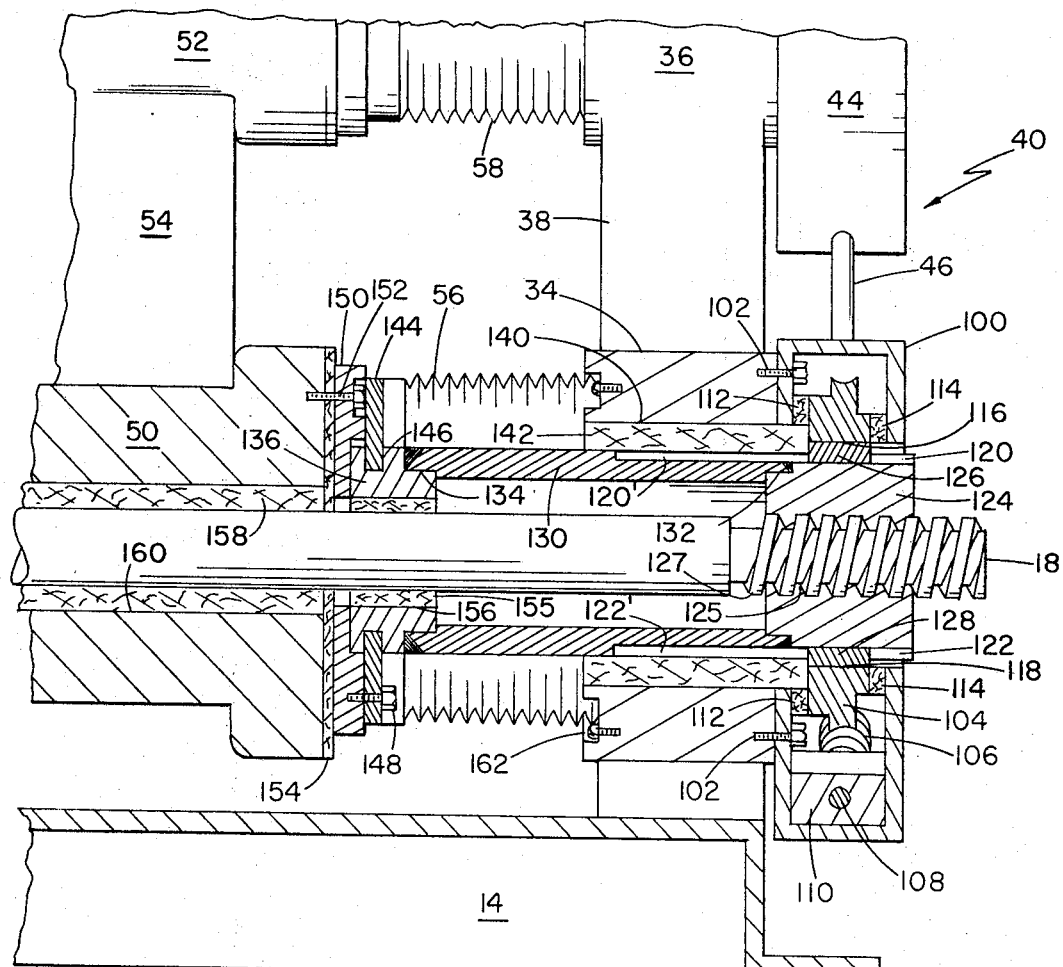
FIG. 4 is a sectional view taken along line 4—4 of FIG. 3.

The portion of adjustment mechanism 40 associated with platen 50, including mechanism 42, is shown in section in FIG. 4. Annular inwardly opening channel 100 attached to bearing block 34 by bolts 102 houses gear 104 driven by worm gear 106 to rotate about the longitudinal axis of rod 18. Worm gear 106 is mounted on shaft 46 which has its lower end 108 journaled in journal block 110. A pair of annular gaskets 112, 114 are packed between gear 104 and the walls of channel 100.

Keyways 116, 118 in gear 104 mating with keyways 120, 122 in drive block 124 receive keys 126, 128, respectively, enabling block 124 to be rotated with gear 104. Drive block 124 has threads 125 which engage threads 127 of rod 18. Keyways 120, 122 are extended along cylindrical sleeve 130 welded to shoulder 132 of drive block 124 and shoulder 134 of collar 136 to form keyways 120', 122' which permit a 10 inch axial stroke of rod 18 carrying block 124 while maintaining rotational engagement of block 124 with gear 104. Sleeve 130 is slidable in bore 140 of block 34 on gasket 142.

Thus, collar 136, sleeve 130, and drive block 124 is compelled to move axially with platen 50 by retaining ring 144 engaging groove 146 of collar 136 and mounted by bolts 148 to adaptor plate 150 which is mounted to platen 50 by bolts 152 with gasket 154 between. Although collar 136 is bound to move axially with platen 50 by retaining ring 144, it is not prevented from rotating with respect to platen 50. Collar 136 is rotatable with sleeve 130 and block 124 about rod 18 on gasket 155 with the combination of groove 146 and retaining ring 144 acting only as a guide during such rotation. Rod 18 is received in gasket 155 in bore 156 of collar 136 and gasket 158 in bore 160 of platen 50. Diaphragm 56 is fastened at one end with retaining ring 144 and at the other end by bolts 162 to block 34.

In operation, fluid motor 60 produces hydraulic flow on lines 62 and 66 resulting in forces on the head ends of pistons 22 and 24 which drive rods 18 and 20, respectively, to separate platens 50 and 52 from platens 10 and 12. This action brings platen 50, FIG. 2, closer to block 34 and drives collar 134, sleeve 130 and block 124 so that keyways 120, 120' and 122, 122' are moved relative to keys 126, 128.

The workpieces are placed between electrode 72 and block 84 and between electrode 74 and block 86 and are supported by platforms 88 and 90. Hydraulic force is applied to housings 76 and 78 to drive the electrodes forward, clamping the workpieces in position.

If the distance between the workpieces is greater than that required for optimum arcing conditions, adjustment may be effected by the following procedures. Hand wheel 47 is rotated causing worm gear 106 to rotate gear 104. Keys 126, 128 capable of axial but not rotational movement in their keyways are driven by gear 104 and cause drive block 124 to be rotated and threaded inwardly toward block 34 on rod 18 to lessen the gap between the workpieces. This is accomplished by the whole assembly including platen 50, adaptor plate 150, retaining ring 144, collar 136, sleeve 130, and drive block 124 being movable as a unit in cooperation with the engagement of threads 125 and 127. The rotation of hand wheel 47, then, has moved that whole unit to the left on rod 18 as pictured in FIG. 4. Of course similar adjustment is simultaneously being effected in the identical structure associated with platen 52.

With the gap between the workpieces set at the proper dimension, the arc may be struck to heat the pieces to be welded. After the proper interval, fluid motor 60 is directed to apply power over lines 64 and 68 to bring the workpieces together. The arc setting is not lost when the platens are thus driven together, for drive block 124 does not rotate or change its position, thus that of the entire unit, relative to rod 18. Rather, block 124 moves axially with rod 18 as enabled by the sliding of keys 126, 128 in keyways 120, 120' and 122, 122', without changing its relationship to rod 18 or gear 104.

Since there is force applied to bring the workpieces together by both platens 12 and 52 and 10 and 50, the unbalanced forces of the single drive offset system are prevented, and a balanced force system applying uniform welding force across the joint and eliminating bending moments and extraneous forces is effected.

Other embodiments will occur to those skilled in the art and are within the following claims.

What is claimed is:

1. A flash welding machine comprising:
first drive means for applying force along a first axis,
first and second platens movable relative to each other by said first drive means, said platens having associated with them first and second current carrying clamp portions, respectively,
second drive means for applying force along a second axis parallel to said first axis,
third and fourth platens movable relative to each other by said second drive means, said third and fourth platens having third and fourth current carrying clamp portions cooperating with said first and second clamp portions, respectively, for holding the work to be welded intermediate said axes,
first adjustable means interconnecting said first drive means and said second platen,
second adjustable means interconnecting said second drive means and said fourth platen, and
adjusting means for varying the positions of said adjustable means and their corresponding platens relative to their corresponding drive means.

2. A flash welding machine comprising:
first drive means for applying force along a first axis,
first and second platens movable relative to each other by said first drive means, said platens having associated with them first and second current carrying clamp portions, respectively,
said first drive means including a first hydraulic cylinder connected with first platen and a first piston connected with said second platen for moving it toward and away from said first platen, first adjustable means interconnecting said first piston and said second platen, second drive means for applying force along a second axis parallel to said first axis, third and fourth platens movable relative to each other by said second drive means, said third and fourth platens having third and fourth current carrying clamp portions cooperating with said first and second clamp portions, respectively, for holding the work to be welded intermediate said axes, said second drive means including a second hydraulic cylinder connected with said third platen and a second piston connected with said fourth platen for moving it toward and away from said third platen, second adjustable means interconnecting said second piston and said fourth platen, and adjusting means for varying the positions of said adjustable means and their corresponding platens relative to their corresponding drive means.

3. The machine of caim 2 in which said first piston extends from said first cylinder through said first and second platens and includes threads beyond said second platen for engaging said first adjustable means, and said second piston extends from said second cylinder through said third and fourth platens and includes threads beyond said fourth platen for engaging said second adjustable means.

4. The machine of claim 3 in which each of said adjustable means includes members each having a first section connected for rotatable movement relative to, and axial movement with, the corresponding one of said second and fourth platens, and a second section for threadably engaging said threads on the corresponding one of said pistons, each of said members including at least one keyway and a key slideable therein for transmitting rotational movement from said adjusting means to said member for changing the position of said member on its corresponding piston and permitting said member to move axially with its corresponding piston relative to said adjusting means.

5. The machine of claim 4 in which said adjusting means includes gears mounted concentrically with said pistons for engaging a one of said keys to rotate a one of said members, and a worm gear engaging each of said gears and driven by a common drive shaft.

References Cited

UNITED STATES PATENTS

| | | | |
|---|---|---|---|
| 2,314,656 | 3/1943 | Morton | 219—97 X |
| 2,656,445 | 10/1953 | Svenson | 219—97 |
| 2,781,026 | 2/1957 | Schlatter et al. | 219—97 X |
| 3,398,254 | 8/1968 | Rietsch | 219—97 |

RALPH F. STAUBLY, Primary Examiner